United States Patent
Compton

[15] 3,667,562
[45] June 6, 1972

[54] MOTORCYCLE SNOWMOBILE CONVERSION UNIT

[72] Inventor: William F. Compton, 675 W. Hamilton, Apt. D, San Pedro, Calif. 90731

[22] Filed: Oct. 30, 1970

[21] Appl. No.: 85,421

[52] U.S. Cl. .................................180/5 R, 180/9.24 A
[51] Int. Cl. ...........................B62m 27/02, B62d 55/04
[58] Field of Search ............... 180/5 R, 9.24 R, 9.24 A, 30

[56] References Cited

UNITED STATES PATENTS

| | | | |
|---|---|---|---|
| 3,318,403 | 5/1967 | Hansen | 180/9.24 R |
| 3,362,492 | 1/1968 | Hansen | 180/9.24 R |
| 3,412,820 | 11/1968 | Wachholz | 180/9.24 R |
| 3,412,821 | 11/1968 | Humphrey | 180/5 R |

FOREIGN PATENTS OR APPLICATIONS 824,447   1/1952   Germany...........................180/9.24 R

*Primary Examiner*—Richard J. Johnson
*Attorney*—William C. Babcock

[57] ABSTRACT

A conversion unit on which the chassis of a motorcycle may be removably mounted after the front and rear wheels of the motorcycle have been separated therefrom, and the motorcycle when so positioned on the unit cooperating therewith to provide a power driven snowmobile. The unit is particularly adapted for use in portions of the country that are subject to extensive snowfall, with the motorcycle capable of being used for its normal purposes during the spring, summer and fall of the year, and during the winter being removably mountable on the unit to provide a vehicle that can negotiate a snow-covered terrain.

5 Claims, 13 Drawing Figures

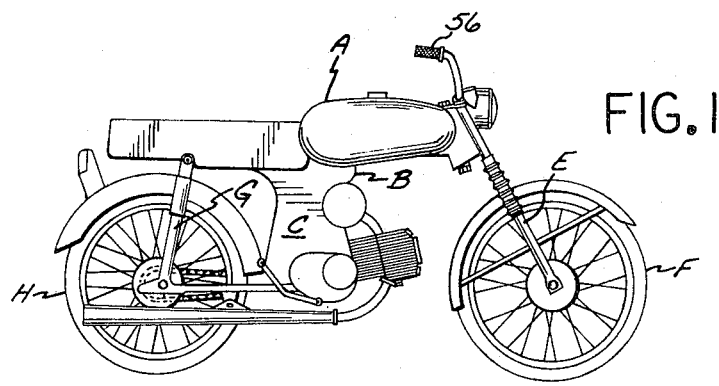
FIG. 1
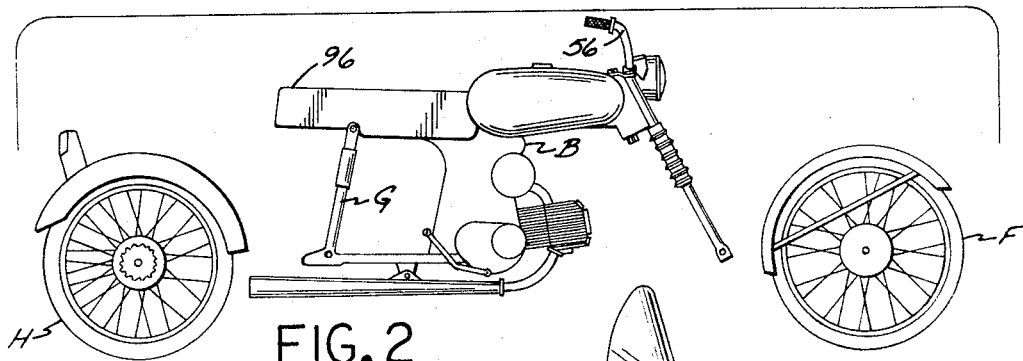
FIG. 2
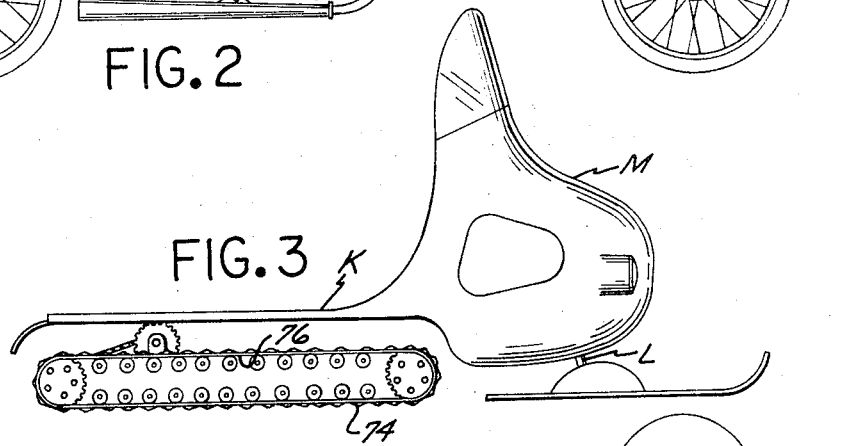
FIG. 3
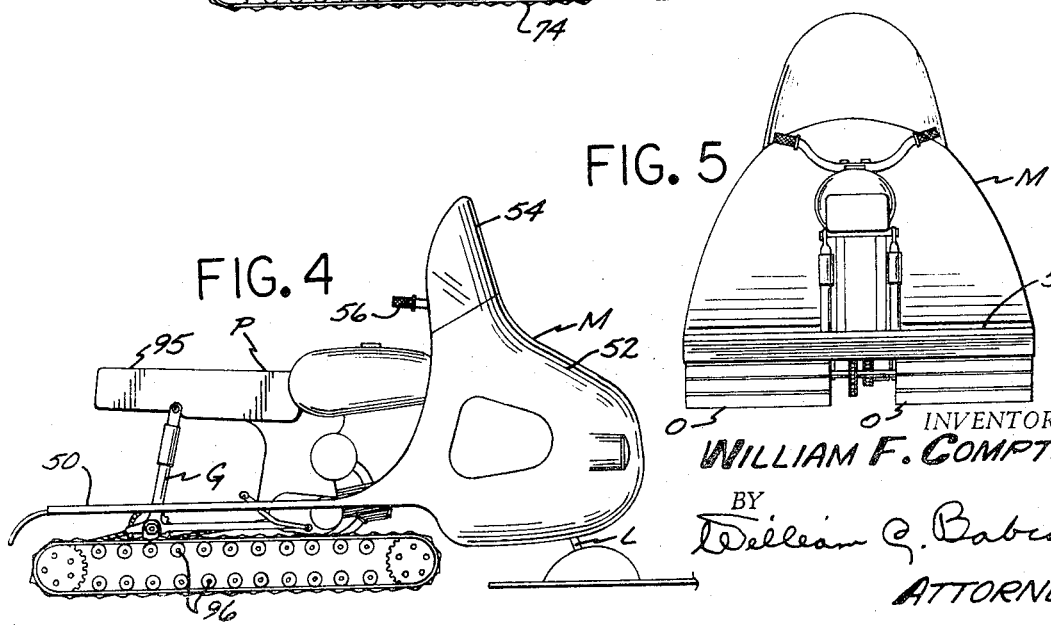
FIG. 4
FIG. 5
INVENTOR.
WILLIAM F. COMPTON
BY William G. Babcock
ATTORNEY

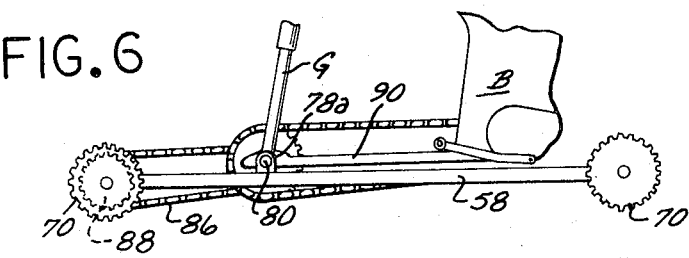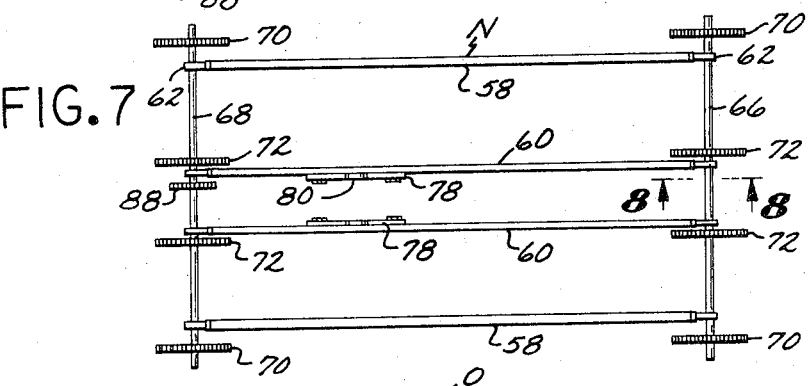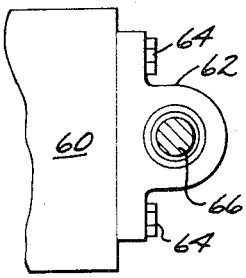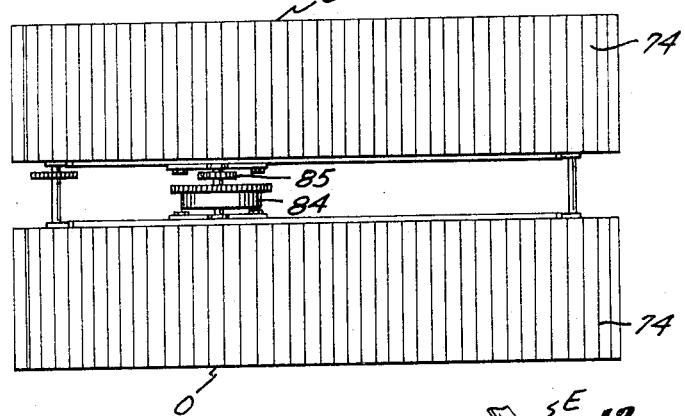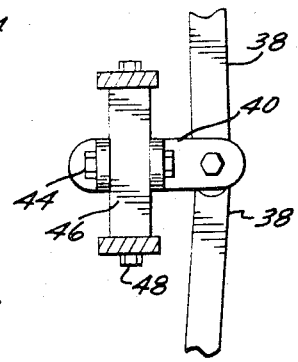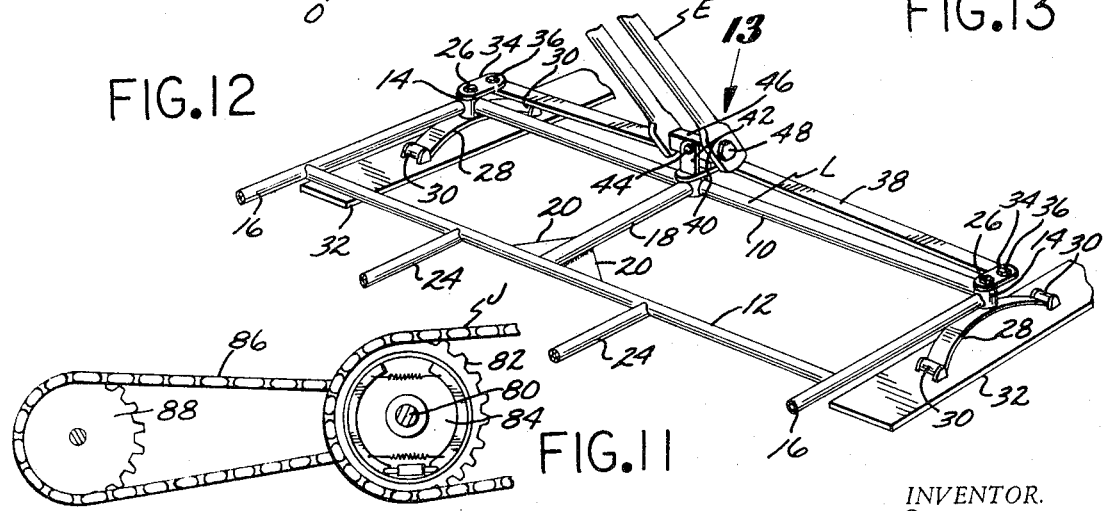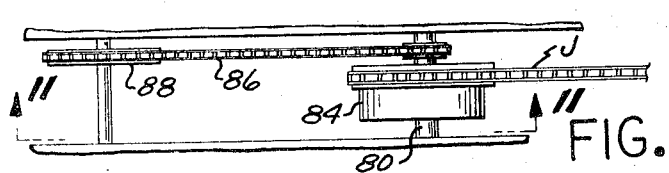

3,667,562

MOTORCYCLE SNOWMOBILE CONVERSION UNIT

BACKGROUND OF THE INVENTION

1. Field of the Invention

A motorcycle snowmobile conversion unit.

2. Description of the Prior Art

In the past, numerous forms of snowmobiles have been devised and used, which is also equally true of motorcycles. However, a motorcycle may only be used successfully when the ground is substantially free from snow or merely a light snowfall thereon, while the snowmobile is particularly adapted for providing a means of transportation when the country has a heavy snowfall. By the use of the conversion unit that is the subject matter of the present invention, a motor cycle may be used in the normal manner when the ground is substantially free from snow, and the snowmobile that results from mounting the chassis portion of the motorcycle on the unit to provide a snowmobile may be used during the balance of the year when the country is subjected to a substantial snowfall.

SUMMARY OF THE INVENTION

A conversion unit that permits the chassis portion of a motorcycle after the front and rear wheels have been separated therefrom to be mounted on the unit, and when so mounted provide a snowmobile that is particularly adapted to provide a means of transportation over snow-covered terrain.

A major object of the present invention is to provide a conversion unit in which but a single power source is required, with the power source being a portion of a conventional motorcycle, and the motorcycle when the wheels are removed cooperating with the conversion unit to supply a snowmobile that may be used on a snow-covered terrain.

Another object of the invention is to supply a conversion unit that has an extremely simple mechanical structure, can be fabricated from standard commercially available materials, and permits a motorcycle to be used for the purposes for which such devices are normally used, but with the motorcycle when the front and rear wheels are removed therefrom cooperating with the unit to provide a snowmobile.

Yet another object is to furnish a conversion unit which permits persons of limited financial means to own both a motorcycle and a snowmobile of which a portion of the latter is the motorcycle chassis.

BRIEF DESCRIPTION OF THE DRAWINGS

FIG. 1 is a side elevational view of a lightweight motorcycle, such as a trail bike or the like;

FIG. 2 is a second side elevational view of a motorcycle, after the front wheel and rear wheel assemblies have been separated from the chassis portion of the motorcycle;

FIG. 3 is a side elevational view of the conversion unit;

FIG. 4 is a second side elevational view of the conversion unit, but after the chassis portion of the motorcycle has been mounted thereon;

FIG. 5 is a rear elevational view of the device shown in FIG. 4;

FIG. 6 is a side elevational view of the drive assembly used on the snowmobile conversion unit;

FIG. 7 is a top plan view of the drive portion of the conversion unit;

FIG. 8 is a fragmentary transverse cross sectional view of the drive portion of the snowmobile taken on the line 8—8 of FIG. 7;

FIG. 9 is a top plan view of the assembly shown in FIG. 7 but with the endless drive belts mounted thereon, and with the drive and brake mechanism being shown in place thereon;

FIG. 10 is a fragmentary top plan view of a portion of the conversion unit showing the drive connection to the motorcycle engine, the brake assembly, and the drive mechanism to power the conversion unit;

FIG. 11 is a longitudinal cross sectional view of a portion of the conversion unit taken on the line 11—11 of FIG. 10;

FIG. 12 is a perspective view of the steering assembly that forms a part of the conversion unit; and FIG. 13 is a top plan view of a portion of the conversion unit taken at the location indicated by the numeral 13 and arrow as shown in FIG. 12.

DESCRIPTION OF THE PREFERRED EMBODIMENT

A conventional lightweight motorcycle A is shown in FIG. 1 that includes a chassis B that includes a motor C as a part thereof. The motor C has a driving sprocket D as is conventional with such devices. The motorcycle A includes a forwardly positioned downwardly extending forked member E that rotatably supports a pneumatic-tired front wheel F. Chassis B has two laterally spaced downwardly extending struts G supported thereon and these struts rotatably supporting a rear wheel H. A chain belt J is provided as best seen in FIG. 11 that is driven by the driving sprocket D. The conversion unit K as shown in FIG. 3 includes a first frame assembly L illustrated in FIG. 12 that has a protective body M mounted thereon. The body M is preferably formed from a resin impregnated fiber glass sheet material. The conversion unit K includes a second frame assembly N illustrated in FIG. 7 that drivingly supports two endless belts O shown in FIG. 9 that are laterally spaced from one another and supply the power to move the snowmobile P illustrated in FIG. 4 over a snow-covered terrain. In FIG. 2 it will be seen that the front wheel F and rear wheel H have been separated from the chassis B with the chassis now adapted to be mounted on the conversion unit K to provide the snowmobile P as shown in FIG. 4.

The first frame assembly L as shown in FIG. 12 includes first and second transverse longitudinally spaced cross pieces 10 and 12. The first cross piece 10 has two vertically positioned bearings 14 mounted on the outer ends thereof, which bearings are secured to the forward extremities of two side pieces 16, which side pieces are also connected to the second cross piece 12. The first cross piece 10 at substantially the center thereof is connected to a rearwardly extending reinforcing member 18, which member is connected to the second cross piece 12 and is further reinforced at this connection by two gusset plates 20. Two laterally spaced rearwardly extending reinforcing members 24 are connected to the second cross piece 12 as may best be seen in FIG. 12. The two bearings 14 have stub shafts 26 pivotally supported therein with the lower ends of the stub shafts being connected to the upper central portion of two bow springs 28.

The bow springs 28 have the free ends thereof secured by shackles 30 or other conventional means to the upper surfaces of two parallel longitudinally extending skis 32. The skis 32 when concurrently pivoted by means that will later be described serve to guide the snowmobile P over a snow-covered surface (not shown). The shafts 26 have links 34 secured to the upper ends thereof, and these links by pins 36 being pivotally connected to a transverse rigid member 38 that has a lug 40 extending rearwardly from the center thereof. Lug 40 rigidly supports two spaced uprights 42 that have a pin 44 extending therebetween that supports a transverse bar 46. The bar 46 has a bore (not shown) extending longitudinally therethrough.

A bolt 48 is provided that extends through aligned openings (not shown) formed in the lower portion of the forked member E, and this bolt 48 serving to pivotally connect the forked members to the bar 46 as shown in FIG. 12. The first frame assembly L serves as a support for the protective body M which has a floor 50 that forms a part thereof, and the floor 50 having a nose-shaped portion 52 extending upwardly therefrom as shown in FIG. 4, which nose-shaped portion supports an arcuate-shaped windshield 54 on the upper portion thereof. The windshield 54 is situated just forwardly of the handlebars 56 that form a part of the forked member E that is included as a part of the motorcycle A. The first frame assembly L and the protective body M mounted thereon, overlie the second frame assembly N as may be seen in FIG. 3, 4 and 5.

The second frame assembly N as shown in FIGS. 6, 7 and 8 includes two outer, laterally spaced side members 58 and two inner, laterally spaced side members 60. The side members 58 and 60 are of substantial thickness, with these side members each supporting a bearing assembly 62 as shown in FIG. 8 on the ends thereof. The bearing assemblies 62 are secured to the rearward and forward extremities of the members 58 and 60 by bolts 64 or other conventional fastening means.

The second frame assembly N as shown in FIG. 6 has forward and rearward transverse shafts 66 and 68 respectively rotatably supported in the bearing 62. The shafts 66 and 68 each have two outwardly disposed sprockets 70 rigidly secured thereto and two laterally spaced inwardly positioned sprockets 72 also affixed thereto. The two endless belts O are of substantial width and preferably formed from a rubber-like material that has transverse cleats 74 formed on the exterior surface thereof.

The endless belts O have the inner surfaces thereof secured to two laterally spaced endless chain belts 76, with each of the endless belts 76 engaging a pair of the sprockets 70 and 72 secured to the shafts 66 and 68 respectively, as shown in FIG. 7. The rearward frame member 60 supports two upwardly extending brackets 78 that are secured thereto by bolts 80 or other conventional fastening means as shown in FIG. 7. The brackets 78 have upwardly extending portions 78a in which aligned openings (not shown) are formed, and these openings being engaged by a transverse shaft 80 that supports a sprocket 82 that is driven by the chain J, as well as a conventional brake assembly 84. The shaft 80 also includes a second driving sprocket 85 best seen in FIG. 9 that has an endless chain belt 86 extending therefrom as shown in FIG. 3 to a third sprocket 88 of substantially greater diameter that is rigidly secured to the shaft 68.

The shaft 80 as may best be seen in FIG. 7 engages the apertured lower ends of the struts G that form a part of the motorcycle chassis B. The struts G are connected to the lower rearwardly extending frame portions 90 that form a part of the chassis B, and are illustrated in FIG. 6. When the chassis B is mounted on the conversion unit K as shown in FIG. 4 and as above described, and the motor C is actuated, the driving sprocket D is, of course, rotated to drive the belt J, with the shaft 80 being rotated as a result thereof to drive the sprocket 85 that is connected to endless belt 86. Sprocket 88 is now driven, as is the shaft 68 and sprocket 70 and 72, to rotate the endless belts O to move the snowmobile assembly as shown in FIG. 4 over a snowy or icy terrain. The chassis B as may be seen in FIG. 4 includes seat 95 on which the user (not shown) rests when the snowmobile P illustrated in FIG. 4 is being used. A number of stub shafts 94 project outwardly from the side member 58 and rotatably support rollers 96 that are in contact with the inner surface of the endless driving belts O to maintain the upper and lower reaches of the belts in substantially parallel relationship with one another.

The use and operation of the invention has been previously described in detail and need not be repeated.

When it is desired to have a motorcycle A for use, the snowmobile P is simply dismantled, with the chassis B and the components associated therewith being reassembled to provide the motorcycle A illustrated in FIG. 1.

The clutch and transmission associated with the motor C are conventional, and are not shown. The brake assembly 84 has the normal brake cable associated with the vehicle A connected thereto, which cable is not shown. The cable is actuated by a rotatable cable (not shown) mounted on the handlebars 56 of the vehicle, which mode of operation of a brake assembly is conventional on motorcycles.

I claim:

1. In combination with a portion of a motorcycle that has a chassis that includes a frame having a forked rearward portion, a seat, an engine supported on said frame, a forked pivotally movable forward portion, handlebars for pivoting said forward portion, and a circular driving sprocket driven by said engine, an assembly that cooperates with said motorcycle to provide a snowmobile, which assembly includes:

a. a first frame having forward and rearward ends;
   b. two laterally spaced, parallel skis disposed under said forward ends;
   c. first means pivotally supporting said skis from said first frame;
   d. second means operatively associated with said first means to cause said skis to pivot in unison when said second means is actuated;
   e. third means for pivotally connecting said forward forked portion to said second means to permit said skis to be pivoted by manipulation of said handlebars;
   f. a protective hollow body assembly to protect the user of said snowmobile, said body mounted on said first frame and extending upwardly therefrom;
   g. a second frame having forward and rearward ends, said second frame including pairs of parallel laterally spaced outer side members and inner side members, and forward and rearward transverse shafts rotatably supported from said forward and rearward ends of said pairs of outer and inner side members;
   h. two laterally spaced, transversely aligned brackets secured to said pair of inner side members;
   i. a third transverse shaft rotatably supported by said brackets;
   j. a driven sprocket rigidly secured to said third shaft;
   k. a first endless chain belt connecting said driven sprocket to said driving sprocket;
   l. first and second longitudinally aligned sprockets secured to said third shaft and rearward shaft respectively;
   m. a second endless chain belt connecting said first and second sprockets;
   n. fourth means for connecting said forked rearward frame portion to said second frame, with said first and second frames longitudinally aligned;
   o. first and second pairs of longitudinally aligned sprockets secured to both said forward and rearward shafts;
   p. first and second pairs of endless chain belts that engage said first and second pairs of said sprockets on said forward and rearward shafts; and
   q. first and second endless exteriorly cleated belts of substantial width, with the interior surfaces of said first and second belts secured to said first and second pairs of endless chain belts respectively, and said cleated belts when rotated driving said snowmobile over a desired terrain on which it is guided by the position in which said skis are disposed.

2. The combination as defined in claim 1 in which said first means includes:

r. two laterally spaced, vertically positioned bearings secured to the forward portion of said first frame; and
   s. two stub shafts rotatably supported in said bearings, and connected to said skis.

3. The combination as defined in claim 2 in which said second means includes;

t. two links rigidly secured to the upper ends of said shafts and extending forwardly therefrom; and
   u. a transversely positioned rigid member pivotally connected to the forward ends of said links.

4. The combination as defined in claim 3 in which said third means includes;

v. a lug extending rearwardly from said cross piece;
   w. two spaced uprights extending upwardly from said lug;
   x. a transversely positioned bar pivotally supported between said uprights with said bar having a bore extending longitudinally therethrough; and
   y. a bolt that extends through transversely aligned openings in said forked portion and through said bore in said bar.

5. The combination as defined in claim 2 which in addition includes:

r. two bow springs secured to said skis, and said bow springs at substantially the center thereof being rigidly connected to the lower end of said shafts.

* * * * *